United States Patent [19]
Serrano et al.

[11] Patent Number: 5,640,441
[45] Date of Patent: Jun. 17, 1997

[54] APPARATUS AND METHOD FOR INCOMING CALL DETECTION AND ALARM CIRCUITRY FOR CELLULAR TELEPHONES

[75] Inventors: Arthur Serrano, West Hills; Asher Avitan, Granada Hills, both of Calif.

[73] Assignee: Oraelectronics, Inc., Chatsworth, Calif.

[21] Appl. No.: 437,173

[22] Filed: May 8, 1995

[51] Int. Cl.$^6$ ............... H04M 1/24; H04M 3/22; H04M 1/00; H04M 9/00
[52] U.S. Cl. ............... 379/34; 379/1; 379/33; 379/372; 379/374; 379/376; 379/387; 379/396; 455/127; 455/343
[58] Field of Search ............... 379/1, 33, 34, 379/58–61, 387, 396, 372, 374, 376; 455/33.1, 54.1, 89, 90, 127, 343

[56] References Cited

U.S. PATENT DOCUMENTS

| | | | |
|---|---|---|---|
| 4,677,656 | 6/1987 | Burke | 379/58 |
| 4,873,712 | 10/1989 | Porco | 379/58 |
| 4,951,311 | 8/1990 | Sterr | 379/396 |
| 5,025,467 | 6/1991 | Wheller | 379/60 |
| 5,224,152 | 6/1993 | Harte | 455/343 |
| 5,243,640 | 9/1993 | Hadley | 379/59 |
| 5,278,995 | 1/1994 | Hwang | 455/127 |
| 5,404,391 | 4/1995 | Wavroch | 379/59 |

Primary Examiner—Curtis Kuntz
Assistant Examiner—Vijay Shankar
Attorney, Agent, or Firm—Matthew F. Jodziewicz

[57] ABSTRACT

An apparatus for use with a cellular telephone to indicate an incoming telephone call to a user includes a cellular telephone battery pack has a circuit that generates a voltage signal with a value representative of the current being drawn from the battery by the operation of the cellular telephone. A status determination circuit monitors the voltage signal and generates a waiting for call state signal whenever the value of the voltage signal decreases from a first selected higher value to a first selected lower value for a first preselected period of time. An incoming call detection circuit whenever the waiting for call state signal is present and either the voltage signal increases from a second selected lower value to a second selected higher value and remains at or above the second selected higher value for a second preselected period of time, or the current goes from a lower preselected current value to a higher preselected current value and remains at or above the higher current value for a third preselected period of time. An alarm is operative upon receipt of the alarm start signal for indicating an incoming call to a user. Also a cutoff circuit monitors the voltage of the battery and disables the apparatus further operation whenever the battery voltage drops below a preselected cutoff value to avoid damage to the battery.

25 Claims, 4 Drawing Sheets

APPARATUS AND METHOD FOR INCOMING CALL DETECTION AND ALARM CIRCUITRY FOR CELLULAR TELEPHONES

RELATED APPLICATION

This application is related to U.S. patent application Ser. No. 08/400,340 by the same inventor filed on Mar. 8, 1995.

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to cellular telephones and methods of alerting a user to an incoming telephone call, and, in particular, for use with circuitry for monitoring a battery pack for alerting the user to an incoming call on the cellular telephone independent of the alarm system of the cellular telephone.

2. Known Prior Art

Cellular telephones are becoming an essential business tool and are appearing everywhere carried by executives who need to be constantly in touch with their offices or available for business activities. In fact, the modern businessman can no longer afford to be out of touch by being separated from his cellular telephone for any length of time. Missed calls then are particularly annoying when the cellular telephone has been merely left in a vehicle or attache while the owner has moved out of earshot of the audible ringer alarm of the telephone when the incoming call arrives. Being unable to hear the telephone ringing, effectively negates its portable usefulness for the user.

However, at present there is no known device capable of retrofitting existing cellular telephone units with a supplemental audible alarm, or an enhanced alarm system, that does not require modification of the internal operating telephone circuitry itself.

OBJECTIVES AND SUMMARY OF THE INVENTION

It is therefore an object of the present invention to provide an accessory for a cellular telephone that provides the user with a choice of an audible or a silent alarm that is supplementary to the main telephone alarm to indicate incoming telephone calls.

It is further an object of the present invention to provide an accessory for a cellular telephone that provides the user with a choice of an audible or a silent alarm that is supplementary to the main telephone alarm to indicate incoming telephone calls that is easily installed and does not require modification of the internal operation of the cellular telephone.

In general, the present invention is embodied in a monitoring circuit that can be incorporated into a standard cellular telephone battery pack that provides a supplemental alarm system to notify the user of an incoming call without requiring modification of the internal operation of the cellular telephone unit. In general, the signals that indicate incoming calls are only available inside the telephone unit, and are not normally available to any electronic circuitry located outside the telephone. The present invention overcomes this limitation by detecting the incoming telephone call by analyzing the characteristics of the power drawn from the battery during operation of the telephone. The invention accomplishes this task by monitoring the power supplied by the battery pack to the unit and is capable of discriminating between the power drain caused by the unit when originating a call and the power drain caused when answering a call.

Cellular telephone units also have transitory registration signals that are not incoming call signals, but require the unit to draw power to transmit as if an incoming call were present. This invention further includes a method to detect the differences between auto-registration operating functions of the cellular telephone unit and incoming call signals by monitoring the power drain and surge characteristics of the cellular telephone unit as measured at the battery pack.

The preferred embodiment of the invention described below is a monitoring circuit built into a removable cellular telephone battery pack that makes little or no changes to the standard battery pack exterior casing. In the described embodiment where the exterior casing is kept intact, there are many times no room for an on/off switch. (However, the modification of adding such an on/off switch to the circuitry is also within the scope of this invention.) Therefore, the call detection circuitry of the preferred embodiment discussed will be on continuously, even when the cellular unit is not in use, i.e., switched off. Thus, the present invention must draw very small amounts of power to avoid draining the battery prematurely, and preferably includes circuitry that detects when the low voltage (1 volt per cell) limit of the battery is reached, and then stops drawing power from the cells, for to continue drawing battery power to deplete the battery below this limit may cause damage to the battery pack cells.

In summary then, the present invention is embodied in circuitry for use with a cellular telephone to indicate an incoming telephone call to a user which monitors a power source, such as a portable battery pack, that supplies electrical current to power the cellular telephone. Preferably inside, or attached to the battery pack, is circuitry which contains operational elements such as: a DC-to-AC conversion circuit that generates a voltage signal having a value representative of the current being drawn by operation of the cellular telephone; a status determination circuit that receives and monitors the voltage signal and generates a waiting for call state signal whenever the value of the voltage signal decreases from a first selected higher value to a first selected lower value for a first preselected period of time; an incoming call detection circuit that receives the waiting for call state signal and monitors the voltage signal to generate an alarm start signal whenever the waiting for call state signal is present and the monitored voltage signal increases from a second selected lower value to a second selected higher value and remains at or above the second selected higher value for a second preselected period of time; and, finally, a user selectable alarm circuit such as an audible alarm, or a silent alarm, such as a vibrator, or a flashing light, that is operative upon receipt of the alarm start signal for indicating an incoming call to a user.

The invention may also be embodied in additional circuitry such as a DC transient monitoring circuit for monitoring the current being drawn by the operation of the cellular telephone, and generating the alarm start signal whenever both the waiting for call state signal is present and the current being drawn by the cellular telephone increases from a lower preselected current value to a higher preselected current value and remains at or above the higher current value for a third preselected period of time.

Additional embodiments of the present invention include a voltage level monitoring circuit acting as a cutoff for monitoring the voltage signal from the battery pack and disabling the device, such as by preventing the generation of the waiting for call state signal by the status determination circuitry, thereby disabling the remainder of the circuits from further operation, whenever the value of the battery pack voltage signal drops below a preselected cutoff value.

A summary of a method of the present invention would include the steps of:

(a) generating a voltage signal having a value representative of the current being drawn by the operation of the cellular telephone;

(b) generating a waiting for call state signal whenever the value of the voltage signal decreases from a first selected higher value to a first selected lower value for a first preselected period of time;

(c) generating an alarm start signal whenever the waiting for call state signal is present and the voltage signal (reflecting changes in the current signal) increases from a second selected lower value to a second selected higher value and remains at or above the second selected higher value for a second preselected period of time; and, (d) generating an alarm signal perceptible by a user upon receipt of the alarm start signal for indicating an incoming call.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

With reference to the accompanying drawings in FIGS. 1 to 4, a preferred embodiment and operation of the invention is now described.

Cellular telephones generally have three operating states:
1. "Standby" or "Sleep" mode: In this mode the unit displays are normally "off" and the DC current drain from the battery is low to prevent unnecessary battery drainage. This mode is sometimes known as a "battery saver mode".

2. "Display mode": In this mode most of the unit displays are enabled, e.g., signal strength, battery strength, etc.. DC current drain from the battery is low, but some transient pulses and ripples occur in the unit's circuitry.

3. "Active mode": In this mode, the transmitter/receiver circuitry is in use and the DC current drain from the battery is high. The unit goes into the active mode when either the "send" button has been pressed, or upon detection of an incoming telephone call to the unit.

Note that the terms low and high with regard to the DC current appearing in the individual unit are relative terms, but these terms normally fall into a fairly regular band of detectible current values.

Figure 1A:
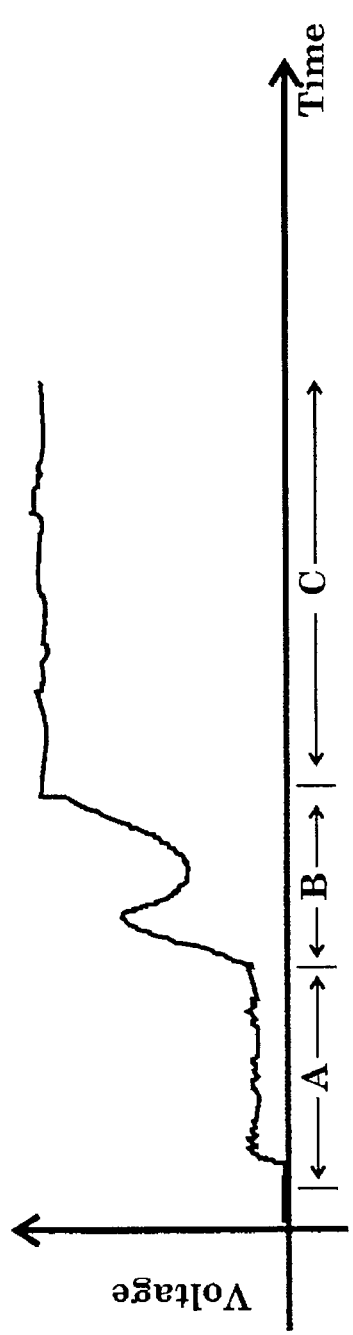
FIG. 1A is graph showing voltage transients appearing on the power line for a cellular telephone over time as the cellular telephone responds to an incoming call.
Figure 1B:
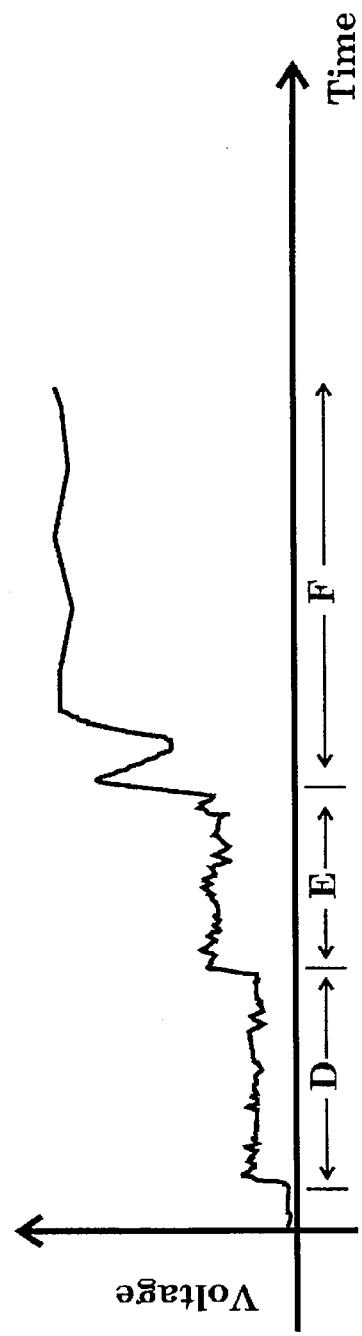
FIG. 1B is graph showing voltage transients appearing on the power line for a cellular telephone over time as the cellular telephone originates an outgoing call.

When the unit is turned ON, the current draw at the battery pack rises with periodic current transients as shown at A and D of FIGS. 1A and 1B, respectively. This is indicative of the standby mode or condition, i.e., when the unit is ON and ready to receive an incoming call, but no further activity has occurred by the user.

When the user touches any of the buttons on the unit, or in the case of some units, when the mouthpiece cover or flip portion of the case has been opened, the unit then goes into the display mode. As an example, if the user opens the flip cover of the unit and attempts to dial digits, the change at E in FIG. 1B occurs to the power current signal. The general current drain increases from that shown at D in FIG. 1B with the larger transients being caused by the now active LCD display. If no user activity follows, the general current drain will revert to a lower level state similar to that shown at D in FIG. 1B. If an auto-registration or incoming call page alert signal occurs, the unit's transmitter responds with a large current level change as shown at B in FIG. 1A. If the call setup continues, the cell site assigns the unit an RF channel to operate on, and the unit's transmitter momentarily switches OFF then ON again to the assigned RF channel as shown at C in FIG. 1A. The call is ready to be answered by the user and the telephone would normally ring, indicating an incoming telephone call. Now it is appropriate to operate an alarm, such as an audible piezoelectric oscillator, or even non-audible alarms such as a vibration device, to indicate the incoming call to the user.

If the user originated a call, the signal characteristics are very similar to that discussed above of answering a call with the channel assignment process being identical. Therefore, the problem to overcome in this situation is for the invention to detect the difference between the two similar signal patterns. When the user attempts to originate a call, he must first enter the number to be called on the unit. This activity causes large pulse transients as shown at E in FIG. 1B. The detection of the transients as shown at E constitutes an event that must occur before the occurrence of an event as shown at C in FIG. 1A or as at F in FIG. 1B can occur.

This sequence of events allows for the discrimination of incoming versus outgoing calls on the unit.

Figure 2:
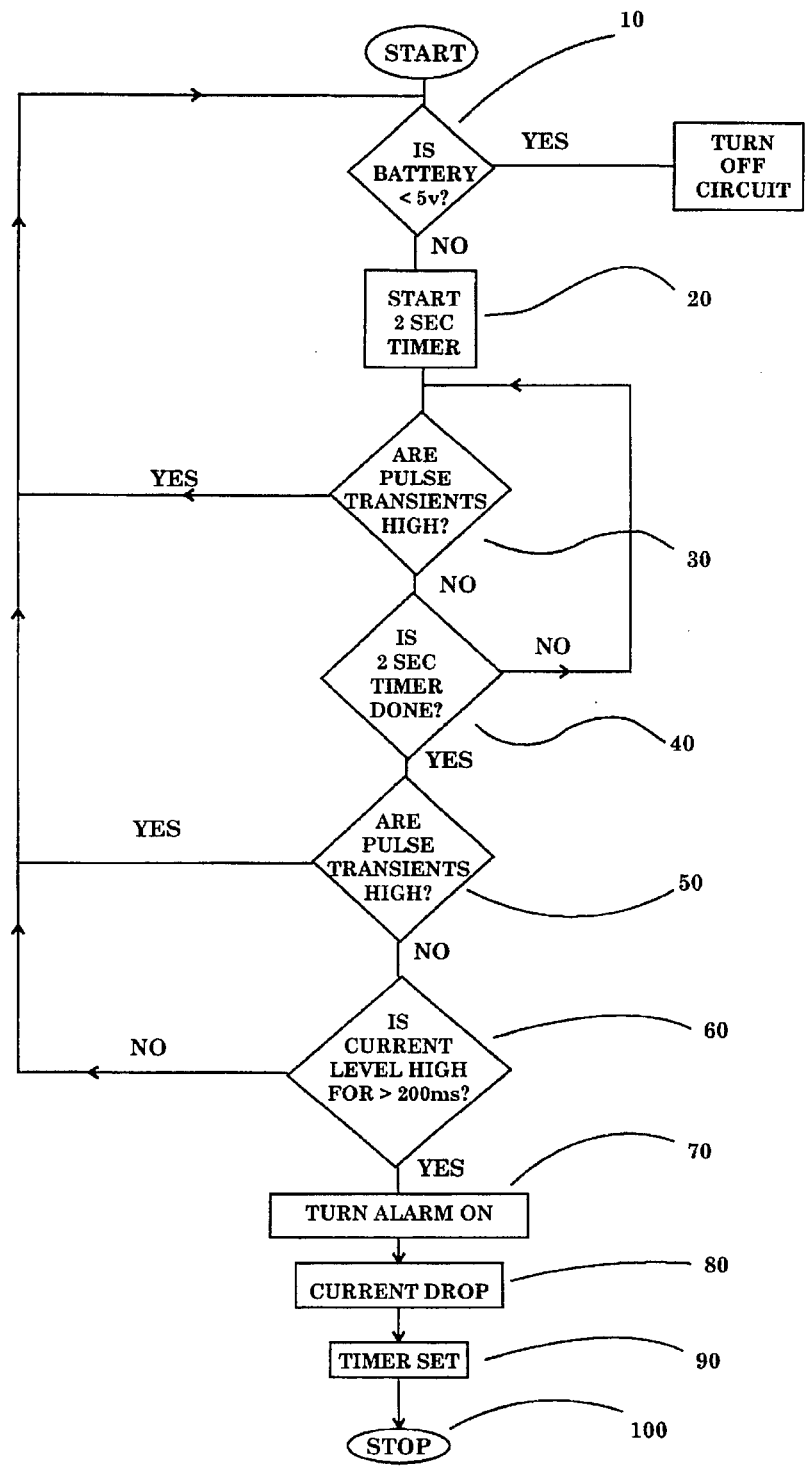
FIG. 2 is an idealized flow chart showing the logic flow of a device embodying the present invention.

FIG. 2 shows a flow chart showing the operation of a circuit embodying the present invention. At 10, the battery pack voltage is tested continuously to ensure the battery voltage does not drop below 1 volt per cell. If the call detection circuits continue to draw power from the battery cell below 1 volt per cell, this can cause irreparable damage to the battery cells. If the battery pack voltage does drop below this minimum value, the call detect circuitry automatically shuts down and no longer draws power from the battery pack.

If the cellular unit is ON, a timer is started (for example, a preset 2 or so second timer) as shown at 20. If no high pulse transients occur as shown at 30, this indicates that the unit is ON and not being used, but is instead waiting for an incoming call.

If the timer completes at 40, then the call detection scheme switches to the next state to await an incoming call. If a high transient occurs at either 30 or 50, then the user is attempting to originate a call, and the telephone is no longer idle and waiting for an incoming call.

If a high current level change occurs at 60, for more than a fixed period of time, for example, about 200 mS, then this indicates an incoming call setup has occurred and the alarm is turned on at 70. The alarm is timed at 70 and if the current level drops as shown at 80, this indicates that the incoming call was terminated and the alarm stops immediately. Otherwise, the alarm will operate for the alarm timer duration 90 and then stop 100.

Figure 3:
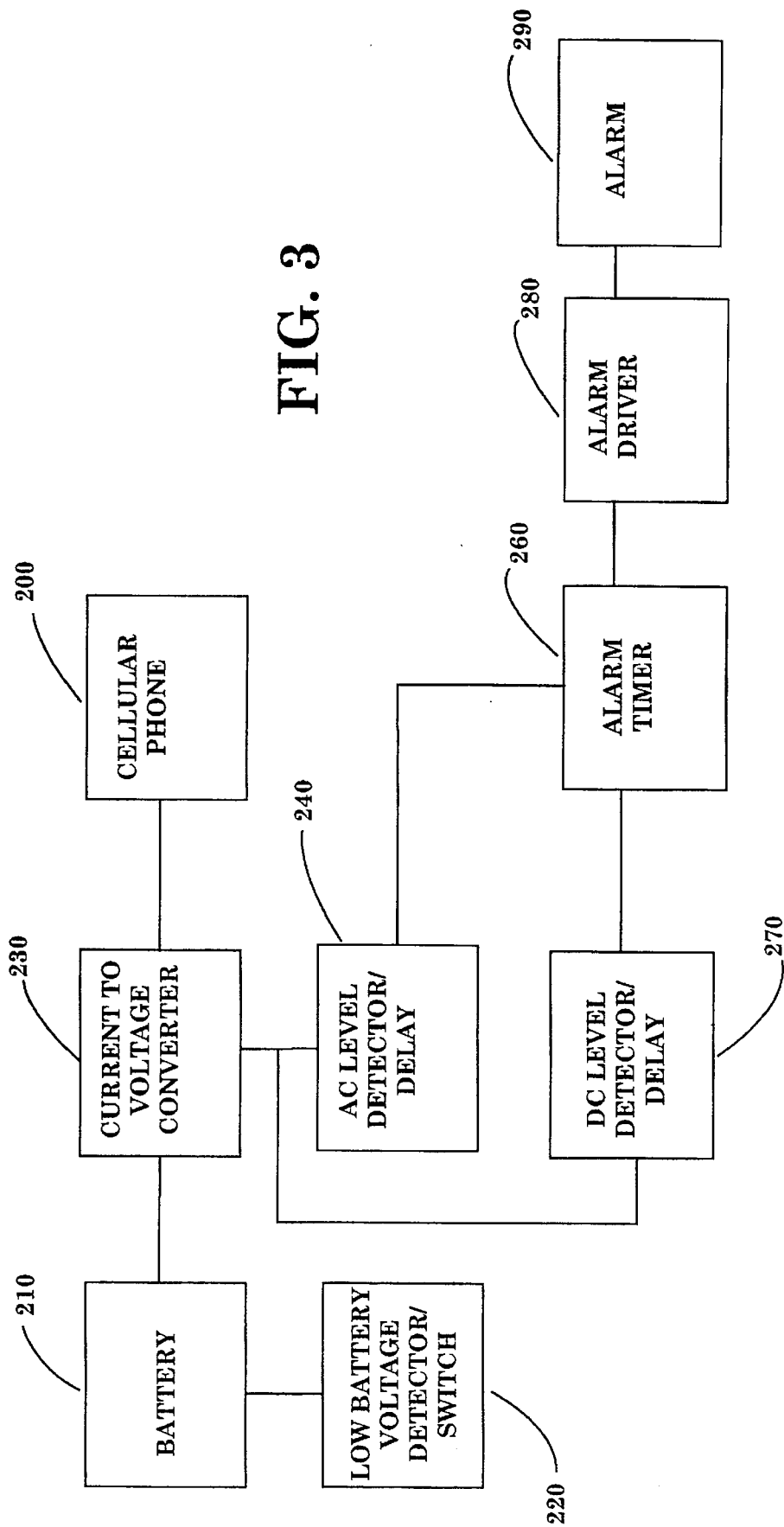
FIG. 3 is an idealized block diagram showing the various operating components that would be found in a preferred embodiment of the present invention; and, FIG. 4 is a schematic diagram of a circuit that embodies the present invention.

FIG. 3 is an idealized block diagram showing the various operating components that would be found in a preferred embodiment of the present invention as has been described.

In FIG. 3, the cellular telephone 200 is connected to battery pack 210 in the normally accepted industry manner of attachment to the cellular telephone case and mating with externally provided contacts.

Low battery voltage detector circuitry 220 acts as a switch to control the operation of the incoming call detection and alarm circuitry to prevent harm from occurring to the battery 210 due to the detection and alarm circuitry continuing to draw power from the battery below a certain level.

A DC to AC conversion circuit 230 is operatively coupled to the current signal generated by battery 210 and generates as an output a voltage signal having a value representative of the current being drawn by the operation of the cellular telephone. This is preferred as an effective manner in which to detect changes in the power demand being made on battery 210 by the operation of the cellular telephone.

Other methods that can be used to monitor the current draw of the unit on the power source would include such known devices and circuits as circuitry providing for the inductive sensing of the power being drawn from the source of electrical power by operation of the cellular telephone. One such circuitry device includes a transformer that is inductively coupled to the source of electrical power such as by having its primary winding of about 5 or so turns coupled to the power lead from the battery or power source, and its secondary winding of about 1000 turns used to detect the current or power demands being made upon the battery or power source by the unit during operation.

Other circuitry includes circuitry designed to detect changes in the magnetic field surrounding the source of electrical power caused by operation of the cellular telephone. An example of such circuitry includes a circuit having a Hall effect transistor coupled to the source of electrical power.

A first circuit 240 provides for determining the status of the cellular telephone 200 by receiving and monitoring the voltage signal output of the conversion circuitry 230 for AC transients appearing in the voltage signal. Circuitry 240 generates as an output a waiting for call state signal whenever the value of the voltage signal decreases from a first selected higher value to a first selected lower value for a first preselected period of time. Circuit 240 is useful to indicate the state of various components of the cellular telephone 200 such as an LCD display which draws a characteristic amount of power and has various characteristic AC transients associated with its operation.

Alarm timer circuitry 260 is used to determine when the incoming call is connected, that the alarm turned off as described more fully below.

Incoming call detection is provided for by DC transient detection circuitry 270 acting in cooperation with AC transient detection circuitry 240 and timer circuits 250 and 260.

DC transient detection circuitry 270 monitors both the voltage signal and current and generates an alarm start signal whenever the waiting for call state signal is present and the voltage signal increases from a second selected lower value to a second selected higher value and remains at or above the second selected higher value for a second preselected period of time, or whenever the waiting for call state signal is present and the current goes from a lower preselected current value to a higher preselected current value and remains at or above the higher current value for a third preselected period of time.

Circuitry 240 and 270 also preferably include delay circuitry to insure that false signals do not inadvertently trigger the alarm circuitry.

An alarm circuit, such as audio driver 280 and piezoelectric oscillator (a "screamer") circuit 290, is operative upon receipt of the alarm start signal from DC transient detector circuitry 270 to provide a sensory signal for indicating an incoming call to a user.

A supplemental alarm circuit may also be added to the circuitry as a vibrator circuit 300 connected to audio driver circuit 280 through user controllable switch 310. By appropriate selection of the switch style, switch 310 may allow a user to select either, or both of the alarms 290 or 300 for activation.

Figure 4:
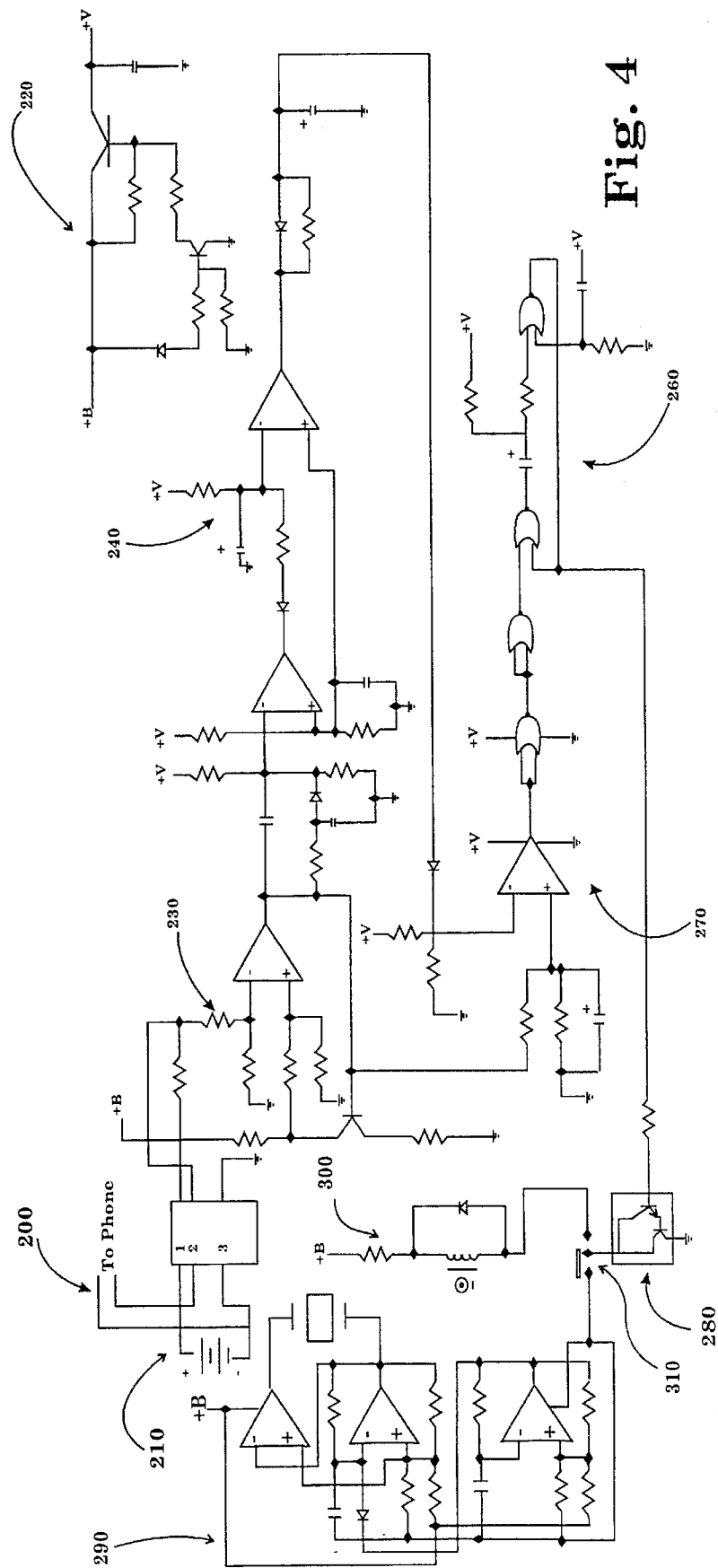

FIG. 4 is a schematic diagram of a circuit that embodies the various block components of present invention as just described where the reference arrows and numerals shown correspond to those described above for the block components of FIG. 3.

The present invention is also embodied in a preferred method for indicating an incoming telephone call on a cellular telephone to a user embodying the present invention which includes the steps of:

(a) generating a voltage signal having a value representative of the current being drawn by the operation of the cellular telephone;

(b) generating a waiting for call state signal whenever the value of the voltage signal decreases from a first selected higher value to a first selected lower value for a first preselected period of time;

(c) generating an alarm start signal whenever the waiting for call state signal is present and the voltage signal increases from a second selected lower value to a second selected higher value and remains at or above the second selected higher value for a second preselected period of time; and, (d) generating an alarm signal perceptible by a user upon receipt of the alarm start signal for indicating an incoming call. Examples of this include providing an audio or a vibratory sensory signal to the user indicating an incoming telephone call on the cellular telephone.

The preferred method embodying the present invention may also include for the step of generating a waiting for call state signal whenever the value of the voltage signal decreases from a first selected higher value to a first selected lower value for a first preselected period of time further an additional step of:

(e) generating the alarm start signal whenever the waiting for call state signal is present and the current goes from a lower preselected current value to a higher preselected current value and remains at or above the higher current value for a third preselected period of time.

Additional steps include adding to the preferred embodiment the step of:

(f) disabling the status determination circuitry from further operation whenever the value of the voltage signal drops below a preselected cutoff value.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An apparatus, monitoring the electrical power demands made by operation of a cellular telephone on a source of electrical power, for indicating an incoming telephone call to a user comprising:

monitoring means operatively coupled to the source of electrical power for providing an electrical state signal representative of the electrical current being drawn by operation of the cellular telephone;

means, operatively coupled to said monitoring means to receive said electrical state signal, for generating a voltage state signal having a value representative of the electrical current being drawn by the operation of the cellular telephone from the source of electrical power;

status determination means for receiving and monitoring said voltage state signal and for generating a waiting for call state signal whenever the value of said voltage state signal decreases from a first selected higher value to a first selected lower value for a first preselected period of time;

incoming call detection means for receiving said waiting for call state signal and monitoring said voltage state signal, and for generating an alarm start signal whenever said waiting for a call state signal is present and said voltage state signal increases from a second selected lower value to a second selected higher value and remains at or above said second selected higher value for a second preselected period of time;

audible alarm means operative upon receipt of said alarm start signal for providing a sensory signal for indicating an incoming call to a user; and, cutoff means for monitoring said voltage state signal and disabling said status determination means from further operation whenever the value of said voltage state signal drops below a preselected cutoff value.

2. The apparatus as in claim 1 wherein said alarm means further comprises:

a vibrator for providing a sensory signal to the user indicating an incoming telephone call on the cellular telephone.

3. The apparatus as in claim 1 wherein said alarm means further comprises:

a light for providing a visual signal to the user indicating an incoming telephone call on the cellular telephone.

4. An apparatus as in claim 1 wherein said monitoring means comprises:

means for inductive sensing of the current being drawn from the source of electrical power by operation of the cellular telephone.

5. An apparatus as in claim 4 wherein said inductive sensing means comprises:

transformer means inductively coupled to the source of electrical power.

6. An apparatus as in claim 1 wherein said monitoring means comprises:

means for detecting changes in the magnetic field surrounding the source of electrical power caused by operation of the cellular telephone.

7. An apparatus as in claim 6 wherein said magnetic sensing means comprises:

circuit means including a Hall effect transistor coupled to the source of electrical power.

8. An apparatus as in claim 1 further comprising:

supplemental alarm means operative upon receipt of said alarm start signal for providing a sensory signal for indicating an incoming call to a user; and, user controlled means for selectively activating one or both of said audible and said supplemental alarm means upon receipt of said alarm start signal.

9. An apparatus, monitoring the electrical power demands made by operation of a cellular telephone on a source of electrical power, for indicating an incoming telephone call to a user comprising:

monitoring means operatively coupled to the source of electrical power for providing an electrical state signal representative of the electrical current being drawn by operation of the cellular telephone;

means, operatively coupled to said monitoring means to receive said electrical state signal, for generating a voltage state signal having a value representative of the current being drawn by the operation of the cellular telephone from the source of electrical power;

status determination means for receiving and monitoring said voltage state signal and for generating a waiting for call state signal whenever the value of said voltage state signal decreases from a first selected higher value to a first selected lower value for a first preselected period of time;

incoming call detection means for receiving said waiting for call state signal and monitoring said voltage state signal, and for generating an alarm start signal whenever said waiting for call state signal is present and said voltage state signal increases from a second selected lower value to a second selected higher value and remains at or above said second selected higher value for a second preselected period of time; and, audible alarm means operative upon receipt of said alarm start signal for indicating an incoming call to a user.

10. The apparatus as in claim 9 wherein said incoming call detection means further comprises:

means for monitoring said electrical state signal and generating said alarm start signal whenever said waiting for call state signal is present and said electrical state signal goes from a lower preselected current value to a higher preselected current value and remains at or above said higher current value for a third preselected period of time.

11. The apparatus as in claim 9 further comprising:

cutoff means for monitoring said voltage state signal and disabling said status determination means from further operation whenever the value of said voltage state signal drops below a preselected cutoff value.

12. The apparatus as in claim 9 wherein said alarm means further comprises:

a vibrator for providing a sensory signal to the user indicating an incoming telephone call on the cellular telephone.

13. The apparatus as in claim 9 wherein said alarm means further comprises:

a light for providing a visual signal to the user indicating an incoming telephone call on the cellular telephone.

14. An apparatus as in claim 9 wherein said monitoring means comprises:

means for inductive sensing of the current being drawn from the source of electrical power by operation of the cellular telephone.

15. An apparatus as in claim 14 wherein said inductive sensing means comprises:

transformer means inductively coupled to the source of electrical power.

16. An apparatus as in claim 9 wherein said monitoring means comprises:

means for detecting changes in the magnetic field surrounding the source of electrical power caused by operation of the cellular telephone.

17. An apparatus as in claim 16 wherein said magnetic sensing means comprises:

circuit means including a Hall effect transistor coupled to the source of electrical power.

18. An apparatus as in claim 9 further comprising:

supplemental alarm means operative upon receipt of said alarm start signal for providing a sensory signal for indicating an incoming call to a user; and, user controlled means for selectively activating one or both of said audible and said supplemental alarm means upon receipt of said alarm start signal.

19. An method for monitoring the electrical power demands made by operation of a cellular telephone on a source of electrical power, for indicating an incoming telephone call to a user comprising:

monitoring the electrical current being drawn by the operation of the cellular telephone from the source of electrical power and generating an electrical state signal representative of the electrical current being drawn by operation of the cellular telephone;

receiving said electrical state signal and generating, based thereon, a voltage state signal having a value representative of the current being drawn by the operation of the cellular telephone from the source of electrical power;

generating a waiting for call state signal whenever the value of said voltage state signal decreases from a first selected higher value to a first selected lower value for a first preselected period of time;

generating an alarm start signal whenever said waiting for call state signal is present and said voltage state signal increases from a second selected lower value to a second selected higher value and remains at or above said second selected higher value for a second preselected period of time; and, generating an audible alarm signal perceptible by a user upon receipt of said alarm start signal for indicating an incoming call.

20. The method of claim 19 wherein said step of generating a waiting for call state signal whenever the value of said voltage state signal decreases from a first selected higher value to a first selected lower value for a first preselected period of time further comprises the step of:

generating said alarm start signal whenever said waiting for call state signal is present and said electrical state signal goes from a lower preselected current value to a higher preselected current value and remains at or above said higher current value for a third preselected period of time.

21. The method as in claim 19 further comprising the step of:

disabling said status determination means from further operation whenever the value of said voltage state signal drops below a preselected cutoff value.

22. The method as in claim 19 further including step of:

generating a vibratory sensory alarm signal perceptible by a user upon receipt of said alarm start signal for indicating an incoming call on the cellular telephone.

23. The method as in claim 19 further including step of:

generating a visory sensory alarm signal perceptible by a user upon receipt of said alarm start signal for indicating an incoming call on the cellular telephone.

24. An apparatus as in claim 19 further comprising the step of:

generating a non-audible sensory signal for indicating an incoming call to a user upon receipt of said alarm start signal.

25. An apparatus as in claim 24 further comprising the step of:

selectively activating one or both of said generating said audible alarm signal and said generating a non-audible sensory alarm signal upon receipt of said alarm start signal.

* * * * *